MAYUKI IWAMATSU
AKIRA FUJIMURA
INVENTORS

United States Patent Office 3,432,014
Patented Mar. 11, 1969

3,432,014
CLUTCH AND BRAKE COMBINATION
Mayuki Iwamatsu and Akira Fujimura, Tokyo, Japan, assignors to Aida Iron Works & Co., Ltd., Kanagawa-ken, Japan
Filed Feb. 20, 1967, Ser. No. 617,332
U.S. Cl. 192—18                                    7 Claims
Int. Cl. F16d 11/06, 13/22, 67/02

ABSTRACT OF THE DISCLOSURE

A clutch and brake combination arranged between a driving wheel running continuously and a crankshaft driven thereby through said combination. A cylinder and piston mechanism is formed by the supporting members of the clutch and brake and is adapted to be supplied with pressure fluid from an outer pressure source for forcing the clutch member into full clutch engagement while at the same time releasing the brake.

Background of the invention

This invention relates to a clutch and brake combination. More particularly, this invention relates to a clutch and brake combination for use in power presses including an annular piston chamber and a cooperating piston formed respectively in the clutch and brake bodies and operative, upon admission of pressure fluid therein, to effect simultaneous clutch engagement and brake release.

Hitherto, a relatively small piston has been provided which is spaced radially outwardly from a number of spring loaded tie bars. As the spring and tie bar assembly occupies a relatively large space, the piston is confined within the remaining limited space to attain a compact overall dimension. This has occasionally resulted in failure to provide the extremely fast and positive action necessary for full clutch engagement and/or full brake.

In addition, the friction linings of the clutch and brake have to be replaced frequently by new ones owing to the wear thereof during use. Any variation in clearance in these parts of the clutch and brake seriously affects their proper action, so the critical thickness of the clearance must always be maintained to secure quick and positive action.

Summary of the invention

The present invention provides a clutch and brake combination having a large piston area with a small stroke for achieving fast and strong action in clutch engagement and brake release. Major elements of the clutch and brake are so shaped as to be directly coupled to the driven shaft in the form of spline engagement. In addition, an auxiliary plate is separately provided for connecting it with the cltuch-brake body through a plurality of tie bars angularly spaced around the driven shaft, and a plurality of relatively strong springs are also arranged concentrically around the driven shaft but spaced radially outwardly from said tie bars. Said springs are compressed between said auxiliary plate and the brake body to normally insure full braking. With this arrangement, an ample space is provided for accommodating an annular cylinder and piston having a large effective area.

Further, the present invention provides means for adjusting the clearance variation caused by the wear of friction linings in the clutch and brake so as to maintain the desired size of clearance substantially constant until it becomes necessary to replace the worn out linings. This means includes an adjusting nut which is screwed on the free end of the driven shaft and is adapted to be secured onto the brake body in its adjusted position.

This invention further provides a bumper pin which can be inserted radially in the clutch cover for striking against a lug formed on the clutch body whenever the press has become stuck.

This invention also provides a relatively large area of friction on the brake face. The brake includes an annular friction face which is concentric with the clutch disc but is spaced radially outwardly thereof.

A principal object of the invention is to provide an improved form of clutch and brake combination.

One object of the invention is to provide a piston with a large effective area for insuring fast and positive action.

Another object of the invention is to provide means for adjusting the clearance between the frictional components of the clutch and brake to keep said clearance at the optimum distance for most effective action.

Another object of the invention is to provide means easily accessible for manipulation for releasing a stuck press.

Another object of the invention is to provide a quick-acting brake which cools off quickly and thus prevents overheating.

Other objects and advantages of the invention will further become apparent hereinafter, and from the drawings.

Detailed description of the preferred embodiment

Figure 1:
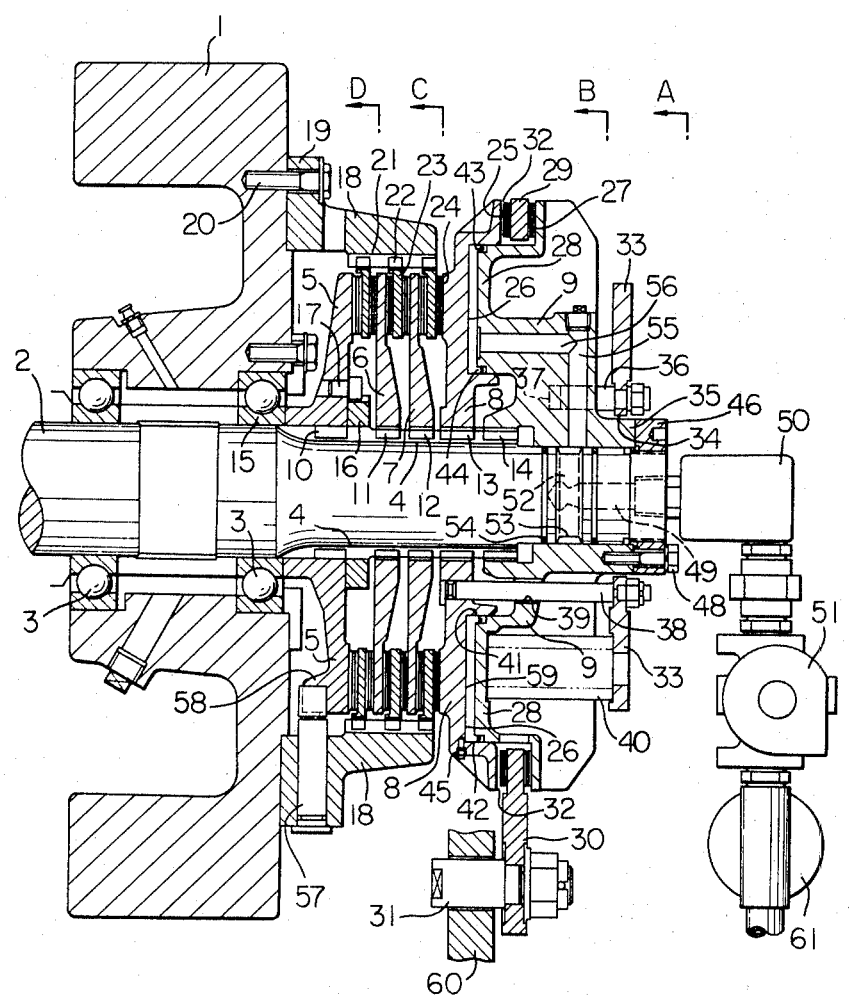
FIG. 1 is a longitudinal sectional view showing the apparatus in the clutch engaging and brake release position.

Referring to the drawings in detail, a drive wheel 1 is shown mounted on a driven shaft 2 through means of ball bearings 3, 3. A portion of the shaft 2 is so shaped as to provide a spline shaft having spline grooves 4 angularly spaced around the exterior thereof. Clutch body 5, clutch discs 6, 7, common clutch-brake body 8 and brake body 9 have angularly spaced and inwardly projecting radial teeth 10, 11, 12, 13 and 14, respectively, fitting closely in but slidable along spline grooves 4. It will be apparent that said bodies and discs are axially but not circumferentially movable with respect to the shaft 2. The clutch body 5 is retained in position on the shaft 2 by an inner race 15 of the bearing 3 on one side and a retaining ring 16 on the other side. Said retaining ring is screwed on a portion of the shaft 2 similarly threaded and has a number of circumferential recesses angularly spaced around the exterior thereof for adjustment, one of which is engaged by a set bolt 17 (see FIG. 2D) to retain the ring 16 in its adjusted position. Brake body 9, while slidable via said spline means 14 and 4, is relatively fixed to shaft 2 and only selectively shiftable during wear takeup adjustment as described hereinafter. A clutch cover 18 is provided circumferentially around the clutch component members and has an integral flange 19 which is firmly secured to the driving wheel 1 by stud bolts 20. The inner cylindircal surface of the clutch cover 18 is provided with spline grooves 21 in which are fitted closely but axially slidably radial teeth 22 formed on friction discs 23 with friction linings secured to either side thereof in a conventional manner.

The clutch-brake body 8 is formed with a clutch face 24 on one side and a brake face 25 and an annular recess or piston chamber 26 on the other side. The clutch-brake body 8 may also be known as a clutch-brake actuator disc because it actuates or effects clutching engagement of the relatively rotatable clutch friction discs, responsive to the application of fluid pressure in one direction, and effects braking engagement of brake components responsive to biasing means in the other direction, to be described in more detail. The brake body 9 is formed with a friction face 27 opposing the face 25 and an annular projection or piston 28 adapted for insertion into the chamber or cylinder 26. The brake faces 25 and 27 are located radially outwardly of the cylinder 26 and piston 28 so that a large annular face is provided for a better braking action. Between the faces 25, 27 is inserted a friction disc 29 with linings secured to either side thereof. Disc 29 has a lug 30 with a bolt 31 secured thereto which bolt is permitted to move axially and slidably in the machine frame 60 so that said disc may be prevented from rotational movement. A short clearance 32 is left between the brake face and the friction linings when the brake is released, as shown in FIG. 1.

Provision is made of an auxiliary plate 33 positioned with its central aperture 34 loosely fitted on the hub 35 of the brake body 9. One or more pins 36 are fixed to the plate 33 and extend into guide holes 37 formed in the body 9 to be guided thereby for a short axial movement with respect to the body 9. The plate 33 has also a number of tie bars 38 angularly spaced around the hub 35 and extending through openings 39 in the body 9 into the clutch-brake body 8. The plate 33 and the body 8 are thus connected together by said tie bars 38 in such a manner that they are movable in unison with respect to the body 9. The tie bars are located as closely as possible adjacent the hub 35 so that a large space may be provided for arranging the cylinder 26, piston 28 and springs 40 conveniently between the brake faces and the tie bars.

As seen in FIG. 1, the annular chamber or cylinder 26 is formed between an inner cylindrical surface 41 and an outer cylindrical surface 42 formed on the clutch-brake body 8 and receives therein the corresponding piston 28 formed on the brake body 9. Suitable packing rings 43, 44 are mounted on the piston 28. A drain cock 45 is also provided for draining any condensed water out of the cylinder 26. A plurality of coil springs 40 are compressed between the auxiliary plate 33 and the brake body 9 so that normally the plate 33 is urged outwardly and, hence, by means of tie bars 38, the clutch-brake body 8 is pulled toward the brake body 9 to full brake position while the clutch is set out of engagement. The length of travel of the clutch-brake body 8, which corresponds to the clearance left between the friction faces and linings of the clutch and brake, must be kept constant even if the linings have become worn. This is accomplished by an adjusting nut 46 screwed on the free end of the shaft 2 and abutting against the edge of the hub 35 of the body 9. The hub 35 has a plurality of internally threaded holes 47 angularly spaced around the vertical edge for selectively engaging with a stud bolt 48 which extends through the nut 46. By turning the nut for adjustment, the bolt 48 is moved into registration with one of the holes 47 and then firmly secured. It will be apparent that the brake body 9 may be slightly advanced or retarded by turning the nut 46 for adjustment and thus the clearance increased by the worn linings is compensated for so as to remain substantially constant until the worn-out linings are replaced.

An air inlet passage 49 is provided centrally in the end of the shaft 2 and is adapted for connection to a pressure source (not shown) through conventional means, such for example as coupling 50, magnetically operable valve 51, oiler 61, etc. The opposite end of the inlet passage 49 is connected with a radial passage 52 which in turn is connected with a circumferential groove 53 formed around the exterior of the shaft 2. O-ring 54 is mounted on the shaft 2 on either side of said groove. Now the groove 53 is further connected with a radial passage 55 formed within the brake body 9 and then with a horizontal passage 56 which opens in the end face of the piston 28.

Figure 2:
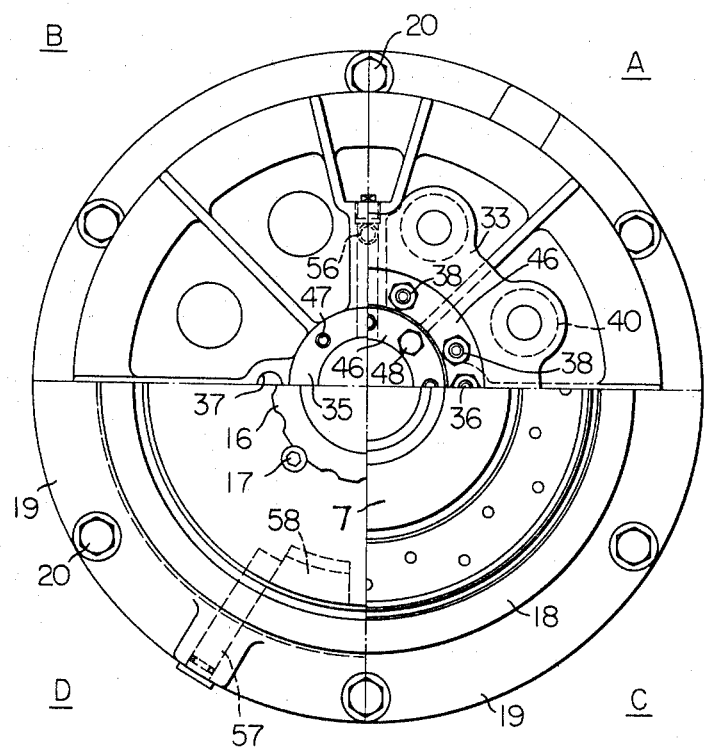
FIG. 2 is generally an end view, but includes four quartered end views A, B, C and D respectively showing the combination in sections taken substantially along the lines A—A, B—B, C—C and D—D in FIG. 1, with certain parts shown in elevation and with other parts removed.

In order to release a stuck machine, especially a stuck power press, a bumper pin 57 is provided for insertion radially through the clutch cover 18 into the way of a lug 58 formed on the clutch body 5. Normally pin 57 is not retained in the clutch cover 18 during operation of the brake-clutch device, but is only inserted therein if shaft 2 of the machine with which it is used becomes stuck, whereupon the driving wheel is stopped, and the pin 57 is inserted as shown in FIGS. 1 and 2. It is apparent that with the pin 57 so inserted and with the inner end thereof projecting as shown, the wheel 1 can then be preferably manually or otherwise rotated so that raised lug 58 bumps against pin 57 thereby freeing or releasing the stuck shaft 2. When the parts are relatively free, the bumper pin 57 is withdrawn and stored exteriorly thereof until needed again. The pin is easily accessible from outside the machine and therefore can be manipulated with ease.

In operation, the drive wheel 1 runs continuously while the driven shaft 2 may be either driven into rotation or stopped depending upon whether air is introduced into the piston chamber or shut off. The clutch-brake body 8 together with the brake body 9 is normally urged to full brake position by force of the springs 40, while at the same time the clutch is out of engagement and therefore shaft 2 will not be rotated. When the operator closes the electrical circuit of the magnetic valve 51, said valve is opened to admit air under pressure into the cylinder 26 through the passages 49, 52, 53, 55 and 56. Increase in pressure in the piston chamber 59 will cause the clutch-brake body 8 to move leftward (FIG. 1) along the shaft 2, the auxiliary plate 33 being simultaneously pulled thereby leftward through means of tie bars 38 against the force of the springs 40. Now the clutch is engaged and the brake is released, so that shaft 2 is driven into rotation by drive wheel 1. When it is desired to stop the motion of shaft 2, the operator simply opens the electrical circuit of the magnetic valve to shut off the air supply from the outside pressure source and at the same time exhaust the air confined within the piston chamber 26 to outside. Then the supercharged force of the springs 40 will instantly cause the plate 33 to move rightward (FIG. 1). Consequently the clutch-brake body 8 snaps into full brake position simultaneously with disengagement of the clutch. The shaft 2 is thus stopped while the wheel 1 is still running.

Although only one embodiment of this invention has been illustrated and described, it will be apparent to those skilled in the art that various changes and modifications may be made therein without departing from the spirit of the invention or from the scope of the appended claims.

What is claimed is:

1. In a clutch and brake mechanism including a driving wheel freely rotatable upon a drive shaft, means for rotatably driving said drive wheel, interrelated clutch means and brake means for respectively connecting said shaft with said drive wheel and for stopping said shaft, comprising in combination:
    (a) A relatively axially fixed annular clutch body and a relatively fixed brake body, respectively disposed in axially spaced relation directly upon and for rotation with said shaft;
    (b) An axially shiftable common brake-clutch actuator disc mounted for rotation directly upon said shaft and interposed in spaced relation between said clutch body and said brake body;
    (c) A plurality of relatively rotatable interleaved, axially interengageable clutch friction discs interposed between said clutch body and said actuator disc, some of said clutch friction discs being rotatable with said drive wheel and the other alternate ones being rotatable directly with said drive shaft;
    (d) Axially shiftable but rotatably fixed brake friction disc means interposed between said brake body and said common actuator disc;

(e) An auxiliary, axially movable plate resiliently mounted in spaced relaiton to and upon said brake body for rotation therewith, means interconnecting said auxiliary plate with said clutch-brake actuator disc as a unit, and resiliently biasing means disposed radially outwardly of the means interconnecting said brake and clutch-brake actuator disc, said resilient means normally biasing said clutch-brake actuator disc and auxiliary plate in a direction to normally effect engagement of the brake friction surface to stop the shaft rotation;

(f) Cooperative fluid pressure operated cylinder and piston means of relatively large capacity formed complementally in the clutch-brake actuator disc and in the brake body, respectively, and disposed radially outwardly of the interconnecting and biasing means aforesaid; and (g) Means for introducing a pressure fluid intermediate adjacently opposed surfaces of said cylinder and piston for shifting said actuator disc away from the brake disc and for interengagement with said clutch friction discs.

2. A clutch and brake combination as defined in claim 1, further including means for adjusting the clearance between the relative clutch and brake components.

3. A clutch and brake combination as defined in claim 1 wherein:
(a) Said brake body includes an axially extended hub;
(b) Said auxiliary plate is mounted about said hub;
(c) Said means for interconnecting the auxiliary plate to said common actuator disc include a plurality of axially elongated tie bars fixed to said auxiliary plate; and
(d) The means resiliently mounting the auxiliary plate include a plurality of helical springs axially compressed between said auxiliary plate and the brake body.

4. A clutch and brake combination as defined in claim 1, wherein the drive shaft includes partially recessed spline means, and the brake and clutch means are respectively complementally splined and directly mounted on said shaft to provide a more compact area around said shaft, resulting in an adjacently larger increased effective area for the fluid pressure operated means and for the friction disc means, while providing a more compact overall device.

5. A clutch and brake combination as defined in claim 1, further including:
(a) A clutch housing attached to and for rotation with said wheel, said housing being circumferentially disposed about the clutch elements, and having a radial aperture therein;
(b) Means in combination with said clutch body and housing for releasing said shaft if it becomes rotatably stuck;
(c) Said latter means including an abutment on said clutch body projecting axially and being selectively alignable with the aperture in said clutch body; and further including an elongated bumper pin selectively insertable in said aperture and adaptable via said wheel connection to repeatedly engage or bump against said abutment on the clutch body until said shaft is rotatably freed.

6. A clutch and brake combination as defined in claim 1, wherein the brake and clutch components are provided with friction faces, said brake friction faces being disposed radially outwardly of the clutch friction faces.

7. A clutch and brake mechanism as defined in claim 1, for use with a power press machine, wherein said clutch and brake components are disposed exteriorly adjacent said drive wheel to facilitate servicing, adjustment and repair thereof exteriorly of the machine proper.

References Cited

UNITED STATES PATENTS

| 2,185,096 | 12/1939 | Treer | 192—18.1 X |
| 2,252,906 | 8/1941 | Williamson | 192—18.1 |
| 2,667,248 | 1/1954 | Wissman | 192—18.1 |
| 3,077,252 | 2/1963 | Treer | 192—18.1 |

FOREIGN PATENTS 1,009,230  11/1965  Great Britain.

BENJAMIN W. WYCHE III, *Primary Examiner.*

U.S. Cl. X.R.

192—53, 71; 188—170